No. 794,144. PATENTED JULY 4, 1905.
J. F. DUNNE.
IGNITING COMPOSITION FOR CIGARETTES OR CIGARS.
APPLICATION FILED APR. 26, 1904.
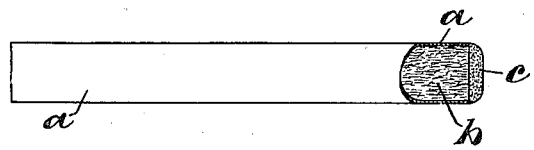
WITNESSES
INVENTOR
John Francis Dunne
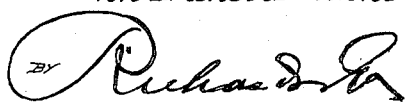
ATTORNEYS No. 794,144. Patented July 4, 1905.

UNITED STATES PATENT OFFICE.

JOHN FRANCIS DUNNE, OF LIVERPOOL, ENGLAND.

IGNITING COMPOSITION FOR CIGARETTES OR CIGARS.

SPECIFICATION forming part of Letters Patent No. 794,144, dated July 4, 1905.

Application filed April 26, 1904. Serial No. 205,040.

*To all whom it may concern:*

Be it known that I, JOHN FRANCIS DUNNE, a subject of the King of England, and a resident of Liverpool, in the county of Lancaster, England, have invented a certain new or Improved Ignitible Composition for Cigarettes or Cigars, of which the following is a specification.

The invention has for its object and effect to provide a composition for application to the ends of cigars and cigarettes which will ignite and the fumes of which shall neither be harmful to the health nor hurtful to the tobacco nor in any way give flavor to or affect detrimentally the tobacco—that is, they impart no taste or flavor to the tobacco.

According to this invention the composition employed is as follows: chlorate of potash, five to five and one-half parts, by weight; bichromate of potash, two parts, by weight; lime, one-fourth part, by weight; manganic dioxid, one part, by weight; cascarilla or tobacco-dust, one part, by weight. With all the ingredients reduced to a fine powder they are thoroughly mixed with a small portion of gum into the consistency of paste, and then the paste is applied to the cigarette or cigar end by dipping the end in it—the paste—or applying the paste to the end.

The drawing hereto annexed shows a cigarette according to the invention, *a* being the cigarette-cover, *b* the tobacco, and *c* the ignitible tip.

This composition is such that it will easily ignite on the striking material commonly employed on match-boxes and will not give a taste in the mouth or flavor the tobacco detrimentally and is not injurious to health.

The above-given composition may be changed by the omission of the lime, as the lime is not essential.

Having now particularly described my invention, what I claim as new, and desire to secure by Letters Patent, is—

1. An ignitible composition for application on the end of a cigar consisting of chlorate of potash, bichromate of potash, manganic dioxid and tobacco-dust, in the proportions substantially as specified.

2. An ignitible composition for application on the end of a cigar consisting of chlorate of potash, bichromate of potash, lime, manganic dioxid and tobacco-dust, in the proportions substantially as specified.

In witness whereof I have hereunto set my hand in presence of two witnesses.

JOHN FRANCIS DUNNE.

Witnesses:
FRANK E. FLEETWOOD,
GUY OKS.